United States Patent
Kåll et al.

(10) Patent No.: US 7,142,875 B2
(45) Date of Patent: Nov. 28, 2006

(54) SELECTING DOMAIN FOR TRANSMITTING A LOCATION SERVICE REQUEST

(75) Inventors: Jan Kåll, Espoo (FI); Veijo Vänttinen, Espoo (FI); Janne Muhonen, Helsinki (FI)

(73) Assignee: Nokia Corporation, Espoo (FI)

( * ) Notice: Subject to any disclaimer, the term of this patent is extended or adjusted under 35 U.S.C. 154(b) by 252 days.

(21) Appl. No.: 10/451,891

(22) PCT Filed: Dec. 19, 2001

(86) PCT No.: PCT/FI01/01132

§ 371 (c)(1),
(2), (4) Date: Jun. 26, 2003

(87) PCT Pub. No.: WO02/054812

PCT Pub. Date: Jul. 11, 2002

(65) Prior Publication Data

US 2004/0058692 A1    Mar. 25, 2004

(30) Foreign Application Priority Data

Dec. 28, 2000    (FI) .................................. 20002867

(51) Int. Cl.
*H04Q 7/20*    (2006.01)
(52) U.S. Cl. ............... 455/456.3; 455/456.5; 455/432.1; 370/259; 370/353

(58) Field of Classification Search ............. 455/456.3, 455/456.5, 432.1, 426.1; 370/259, 353, 352
See application file for complete search history.

(56) References Cited

U.S. PATENT DOCUMENTS

| | | | |
|---|---|---|---|
| 5,901,352 A * | 5/1999 | St-Pierre et al. .......... | 455/426.1 |
| 6,219,557 B1 | 4/2001 | Havinis | |
| 6,888,803 B1 * | 5/2005 | Gentry et al. ............... | 370/259 |
| 2001/0003093 A1 * | 6/2001 | Lundin ........................ | 455/456 |
| 2002/0126701 A1 * | 9/2002 | Requena ...................... | 370/469 |
| 2004/0162068 A1 * | 8/2004 | Lamb et al. ............. | 455/432.1 |
| 2005/0003805 A1 * | 1/2005 | Zaffino ..................... | 455/414.1 |

FOREIGN PATENT DOCUMENTS

| | | |
|---|---|---|
| WO | WO 00/05907 | 2/2000 |
| WO | WO 00/25545 | 5/2000 |

* cited by examiner

*Primary Examiner*—Danh Cong Le
(74) *Attorney, Agent, or Firm*—Squire, Sanders & Dempsey L.L.P.

(57) ABSTRACT

In a system comprising at least two different domains both supporting location services, the Gateway Mobile Location Center routing the location service requests receives a routing address for both domains, i.e., at least two addresses, if the target mobile station has subscription to both domains. In order to select via which domain the attempts should be first made to obtain the location information of the target MS is found out at least in one domain and preferably in both domains.

21 Claims, 2 Drawing Sheets

SELECTING DOMAIN FOR TRANSMITTING A LOCATION SERVICE REQUEST

FIELD OF THE INVENTION

The invention relates to selecting a domain via which a mobile terminated location request is transmitted in mobile communications systems comprising two different domains both supporting location services, and more particularly to systems comprising a packet switched domain and a circuit switched domain. A mobile communications system refers generally to any telecommunications system which enables wireless communication when users are moving within the service area of the system. A typical mobile communications system is a Public Land Mobile Network (PLMN).

BACKGROUND OF THE INVENTION

Mobile communications systems have been developed because there has been a need to free users to move away from fixed telephone terminals without impairing the availability of users. An example of an existing mobile communications system is the pan-European mobile communications system GSM (Global System for Mobile Communications). The General Packet Radio Service GPRS is one of the services of GSM Phase 2+. The GPRS service allows packet data transfer between mobile data terminals and external data networks, while the "original" GSM network allows circuit-switched communications. If the user is attached to a packet data service and to a circuit-switched service at the same time, he/she is connected to two different kinds of domains. The GPRS network architecture is illustrated in FIG. 1.

Simultaneously with the development of mobile communications systems, various services have also been introduced in mobile communications systems, such as value added services customized according to the user's location. Examples of location-specific value-added services include localized weather forecasts, entertainment programmes, timetables, navigation and locating a mobile user in an emergency. Additionally, the user's location can also be used for law-enforcement purposes. These services are called location services (LCS). Here the term 'location service' refers to the task of tracking the location of a mobile station in terms of geographical coordinates. This task is not necessary for routing calls. There are several known methods by which a mobile station can be located with reasonable precision. Details of the location procedure are not relevant to this invention, however.

Patent application WO 00/25545, which is incorporated herein by reference with its cross-references, discloses how to locate a target mobile station MS in systems comprising two different domains supporting the LCS. In WO 00/25545 an GMLC (Gateway Mobile Location Center), via which the location service requests are routed, receives as routing instructions for LCS the current address of a first network node providing location information in the first domain and the current address of a second network node providing location information in the second domain when both addresses are available. When the GMLC receives these two addresses, it determines the preferred type of domain via which the GMLC first tries to get location information on the target MS, and if the location information can not be obtained via the preferred domain, the GMLC tries the other domain.

A problem with this solution is that the GMLC may receive both addresses even when the target MS is not reachable via a domain since the entity providing the routing instructions does not know whether or not the target MS is reachable. Thus the GMLC may try to get location information first via a domain where the mobile station is not reachable. This leads to unnecessary delays and causes unnecessary signalling.

Similar problem exists also in the third generation mobile communications systems which also comprise a PC domain and a CS domain. Some of the systems comprise different access networks, such as a second generation access network (e.g. GSM) and a third generation access network. These different networks may also have different domains.

BRIEF DESCRIPTION OF THE INVENTION

An object of the present invention is to provide a method and an apparatus for implementing the method so as to solve the above problem. The object of the invention is achieved by methods, a system and network nodes which are characterized by what is stated in the independent claims. The preferred embodiments of the invention are disclosed in the dependent claims.

The invention is based on realizing the problem and solving it by enhancing the LCS routing information procedure by steps of finding out the state of the target MS at least in one domain and preferably in both domains and utilizing state information to select the domain via which attempts are first made to obtain the location information on the target MS. The state indicates whether the target MS is attached to the domain, and preferably whether the target MS is active in the domain.

The term 'domain' covers here different domains within a network and different networks to which the target MS may have access.

An advantage of the invention is that it prevents sending of location requests to a domain the MS is not attached to, and thus unnecessary signalling and delays are avoided.

In one embodiment of the invention the state indicates whether the target MS is active in the domain. The further advantage of the embodiment is that by relaying the location request via the domain in which the target MS is active extra signalling is not necessary needed.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
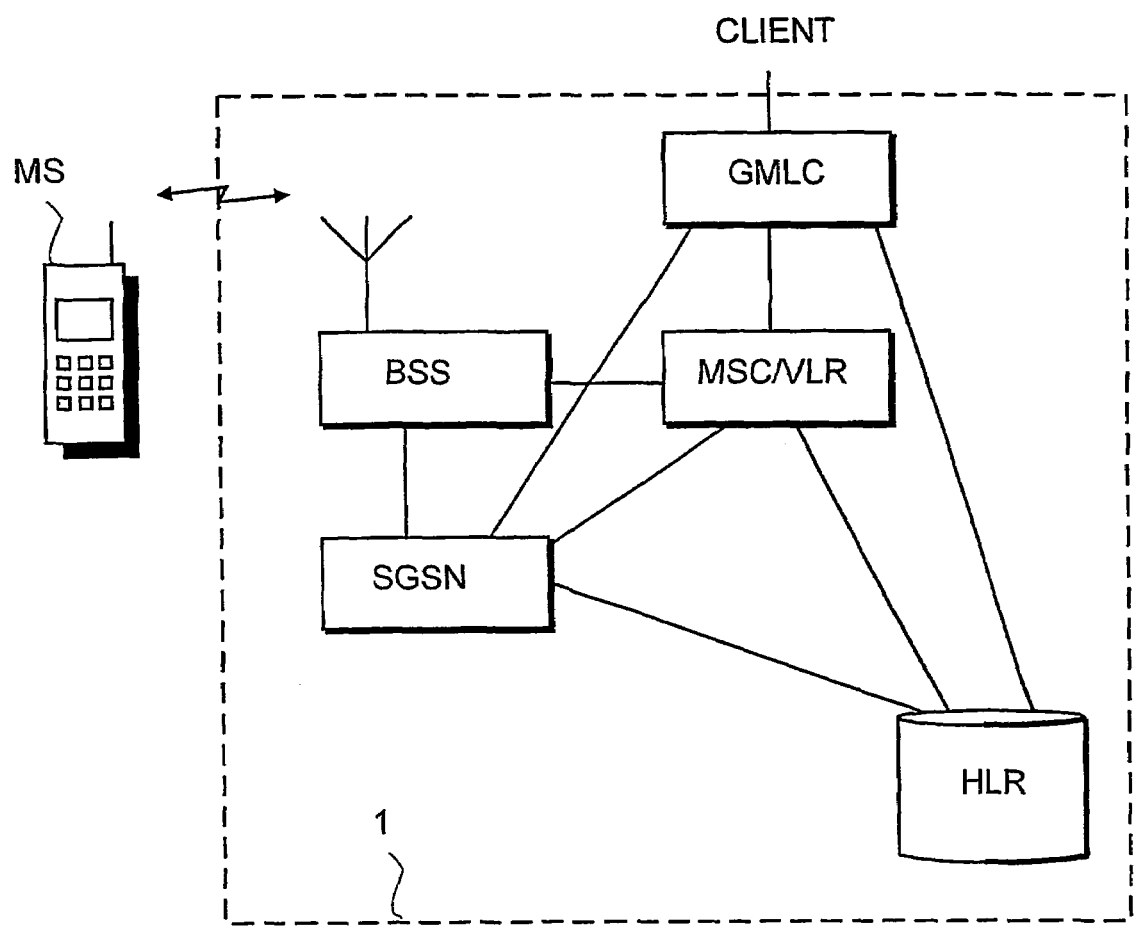
FIG. 1 is a block diagram illustrating an embodiment of a telecommunications system where the invention can be used.

FIG. 1 is a block diagram illustrating a preferred embodiment of the invention. The invention will be described in connection with the GSM and the GPRS (General Packet Radio Service), substantially in accordance with the relevant ETSI recommendations. However, it should be understood that the GSM and GPRS systems have been chosen only for the purposes of illustration, and the invention is applicable in any telecommunications system supporting circuit-switched and packet-switched connections. Another example of such a system is a 3GPP AII-IP system, i.e. a UMTS (Universal Mobile Tele communications System) based on IP (Internet Protocol) technology and defined in the 3$^{rd}$ generation partnership project 3GPP. The UMTS is one of the third generation mobile communications systems. The third generation mobile communications systems may comprise different access networks, such as GSM, UTRAN (UMTS Radio Access Network), WLAN (Wireless Local Access Network) and/or BRAN (Broadband Radio Access Network) where the invention can be used to select the network and a domain within the network.

FIG. 1 shows a simplified network architecture and illustrates only those elements of the telecommunication system 1 that are essential for understanding the invention. Network nodes shown in FIG. 1 are logical units, the implementation of which may differ from the one described. It is obvious to one skilled in the art that the system 1 also comprises other functions and structures which need not be described in closer detail here. In other systems the names of the network nodes and mobile stations may differ from those disclosed here.

Apart from the Gateway Mobile Location Center GMLC, the remaining nodes are known from prior art GSM and GPRS systems. The GMLC performs location services related to mobile equipment and/or subscribers for LCS clients. The GMLC in accordance with the invention may be configured to perform one or more of features disclosed below by preferred embodiments.

The MS is normally a mobile phone, but it can be any entity which uses the standard air interface, for example a measurement unit connected to the network through the air interface. In this context, a mobile station generally refers to a combination of a mobile unit and a mobile subscriber identified in the system by e.g. a SIM (Subscriber Identity Module) card detachably coupled to the mobile unit.

The basic GSM network comprises a base station subsystem BSS as a RAN (Radio Access Network). The network subsystem comprises a mobile services switching centre MSC, a visitor location register VLR and a home location register HLR. In the example of FIG. 1 the MSC and the VLR are in the same network node MSC/VLR. The MSC manages the switching of circuit-switched services and carries out functions that are only characteristic of mobile communications, in co-operation with the VLR and the HLR. The VLR stores the subscriber data of an MS temporarily while the MS is in the area of the MSC connected to the VLR if the MS is attached to circuit-switched services. For the location service LCS, the MSC/VLR has a connection to the GMLC. This basic GSM network offers a circuit-switched connection, i.e. an CS domain to the LCS via the MSC/VLR to a mobile station attached to the basic GSM network.

In a circuit switched domain (CS domain) the MS can be located within one cell if the mobile station has an ongoing call. When the MS has an ongoing call, the state of the MS is active. If the MS does not have an ongoing call but is attached to the CS domain, the MS is in idle state. The MS is attached to the CS domain when the power is on. When the power is off, the MS is in detached state, i.e. is detached from the CS domain and cannot be reached via CS domain.

In FIG. 1, the GPRS comprises a serving GPRS support node SGSN. The SGSN is a node serving a mobile station MS. Each SGSN controls a packet data service within the area of one or more cells in a cellular packet radio network. Usually basic GSM and GPRS have the same radio access network and each support node SGSN is therefore connected to a certain local element of the GSM system. However, the number of radio access networks and/or how the nodes are connected to these radio access networks is irrelevant to the invention. This connection is typically made to the base station subsystem BSS. The SGSN is also provided with a signalling interface to the MSC/VLR. For the location service LCS, the SGSN network has a connection to the GMLC. This route offers a packet-switched connection, i.e. a PS domain, to the LCS.

The state of the MS in the PS domain is easily found out from the mobility management (MM) activities related to a GPRS subscriber. The MM activities are characterized by three different MM states of the mobile station MS: Idle State, Standby State, and Ready State. Each state describes a certain level of functionality and information allocated to the MS and to the SGSN. The information sets relating to these states, which are maintained in the SGSN and in the MS, are denoted MM contexts. The MM context comprises subscriber data, such as the subscriber IMSI, TLLI, and location or routing data, etc. In the idle state, the mobile station MS is not reachable from the point of view of the GPRS. If the MS is of dual mode type, i.e. is capable of operating in GPRS and GSM networks, it may be in the GSM network when being in GPRS-Idle state. In the GPRS-standby and GPRS-ready states, the mobile station MS is attached to the GPRS network and in the GPRS-ready state the MS, is active.

The home location register HLR of the GSM network comprises GPRS subscriber data and routing information, including the International Mobile Subscriber Identity (IMSI). The HLR maintains in its registers a subscription list for each subscriber over the services of the subscriber. The home location register HLR in accordance with the invention may also be configured to perform one or more of functions disclosed below by preferred embodiments. The HLR of a roaming mobile station MS may be in a different mobile communications network than the serving SGSN or the serving MSC/VLR. The HLR is not usually aware of the state of the mobile station, it only knows the addresses since th HLR is not usually informed on the MS detach. Thus, the HLR has for subscribers (target MSs) having subscription to both CS domain and PS domain routing address in both domains regardless of the state of the MS in the domains. In some GPRS systems the HLR may have a flag 'purged for GPRS' on when the MS is detached from the GPRS domain. For subscribers having subscription only to one domain the HLR has a routing address only in that domain.

The present invention can be implemented in existing network nodes. They all have processors and memories with which the inventive functionality described below may be implemented.

Figure 2:
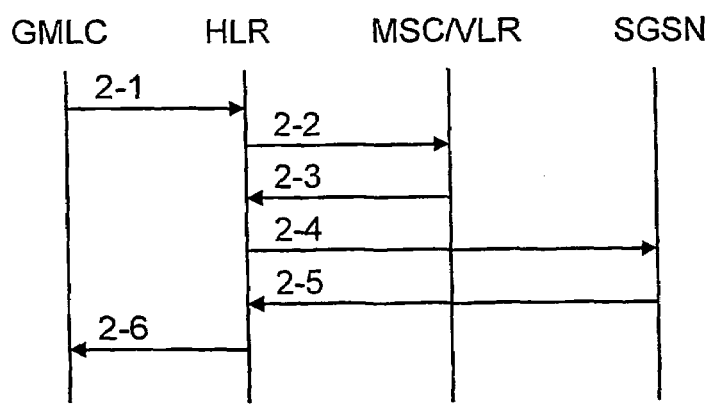
FIGS. 2 to 5 illustrate signalling in different embodiments of the invention.

FIG. 2 illustrates signalling according to a first preferred embodiment of the invention when the GMLC has received an LCS service request from a client. For the sake of clarity it is assumed that the request concerns only one target MS. It is also assumed that the target MS has a subscription to both domains, i.e. has in the HLR a routing address for both domains. It is also assumed that the target MS supports both domains. The support for a domain can be deduced from a classmark of the target MS and the HLR may be configured to give routing address only in the domains the target MS supports, i.e. interpret that the subscriber has subscription only to domains the target MS used by the subscriber supports.

In response to receiving an LCS service request from the client, the GMLC verifies the identity of the LCS application and its subscription to the LCS service requested. The GMLC also derives an identifier (e.g. the MSISDN) of the target MS to be located and the LCS QoS (quality of service)

from either the subscriber data or from the data supplied by the client. Then the GMLC checks whether or not the MS subscriber is a GSM subscriber, i.e. whether or not there is a VMSC and/or an SGSN address for the MS, by sending message 2-1 to the HLR of the target MS. Message 2-1 is preferably a MAP_SEND_ROUTING_INFO_FOR_LCS message. The message is routed to the HLR using the MSISDN number. In response to receiving message 2-1, the HLR verifies that the GMLC, i.e. checks, if the GMLC is authorized to request MS location information.

In the first preferred embodiment of the invention the HLR is configured to request, in response to receiving message 2-1, information on the state of the target MS in both domains at least if the target MS has routing address to both domains. Thus, in the example illustrated in FIG. 2, the HLR requests the state of the target MS in the CS domain by sending message 2-2 to the MSC/VLR serving the target MS. Message 2-2 is preferably a MAP_PROVIDE_SUB-SCRIBER_INFORMATION_message.

The MSC/VLR detects whether the MS is engaged in a circuitswitched call, i.e. whether the subscriber state in CS domain is active. The MSC/VLR indicates the subscriber state to the HLR in the message 2-3. Message 2-3 is preferably a MAP_PROVIDE_SUBSCRIBER_INFOR-MATION_RESPONSE message.

The HLR also requests the subscriber state of the target MS in the PS domain by sending message 24 to the serving SGSN. The SGSN sends the MM state of the target MS to the HLR in message 2-5.

After receiving messages 2-3 and 2-5, the HLR composes message 2-6 to the GMLC. In the first preferred embodiment of the invention, the HLR is configured to add to message 2-6 only the address of the MSC/VLR if message 2-3 indicated that the subscriber state was not detached and message 24 indicated that the MM state was idle. Correspondingly, the HLR is configured to add to message 2-6 only the address of the SGSN if message 2-4 indicated that the MM state was either standby or ready and message 2-3 indicated that the subscriber state was detached. When message 2-6 is ready, the HLR sends message 2-6 to the GMLC.

If the GMLC receives only either the address of the SGSN or the address of the MSC/VLR, then the GMLC sends the location request towards the address in message 2-6. If both addresses, i.e. the address of the SGSN and the address of the MSC/VLR, were received from the HLR in message 2-6, the GMLC has to decide which one to try first. An operator and/or a subscriber can define aset of rules (i.e. selection criteria) which is used for selecting the domain. The set of rules comprises at least one rule. Examples of different rules are: selection on the basis of the tariffs (which may change with time), selection on the basis of the target MS capability and/or according to the type or age of the SIM card. The the signalling load in different domains can be one criterion, so that the less loaded domain is preferred. The subscriber data may also have an indication of the preferred domain, or the client may indicate the preferred domain, or the GMLC may ask the preferred domain from the client.

The relaying of the location request from the GMLC and how the location of the target MS is determined is not shown in FIG. 2 (and in FIGS. 3, 4 and 5) since it is irrelevant to the invention.

In one embodiment of the invention the HLR is configured first to check the state of the target MS in the CS domain and if the state is active, not to request the state of the target MS in PS domain, but instead send message 2-6 comprising the address of the MSC/VLR. Thus, in this embodiment, messages 24 and 2-5 are omitted when the target MS is engaged in a circuit switched call.

In one embodiment of the invention the HLR is configured first to check the state of the target MS in the PS domain and if the state is ready, not to request the state of the target MS in the CS domain, but instead send message 2-6 comprising the address of the SGSN. Thus, in this embodiment, messages 2-2 and 2-3 are omitted when the target MS is active in the PS domain.

In one embodiment of the invention the HLR is configured to add both the addresses of the MSC/VLR and the SGSN and the states of the MS in the CS domain and the PS domain, and the GMLC is configured to prefer the address if the corresponding state indicates that the target MS is active in that domain and to ignore the address if the corresponding state indicates that the target MS is not attached tp that domain.

In some other embodiments of the invention the GMLC may add to the message requesting routing information, i.e. message 2-1, a parameter or parameters, the value(s) of which indicate(s) whether the GMLC requires state information on both domains or only one of the domains or none of the domains. In the embodiments the HLR is configured to act according to the parameter value(s). In these embodiments of the invention the GMLC may be configured to store previously obtained location information and/or information when and from which network node previous location information was obtained and on the basis of the stored information to decide whether or not it requires state information.

Figure 3:
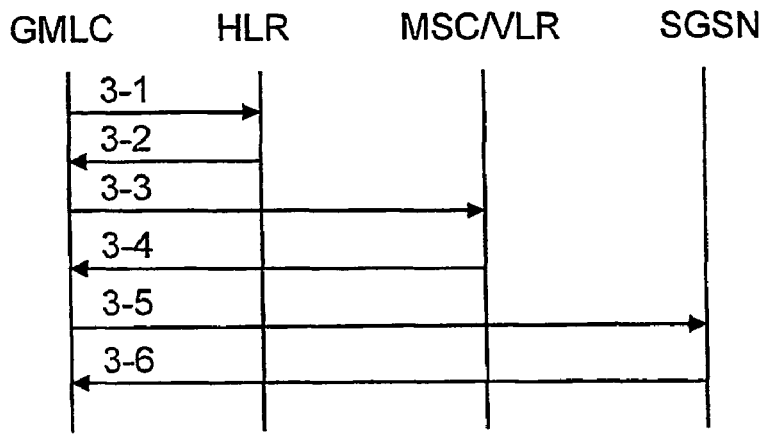

FIG. 3 illustrates signalling according to a second preferred embodiment of the invention. The assumptions made for FIG. 3 are the same as for FIG. 2.

In response to receiving an LCS request from the client, the GMLC acts as described for FIG. 2 and sends message 3-1 requesting routing information for LCS to the HLR. The HLR verifies the GMLC and sends response message 3-2 comprising the address of the SGSN and the address of the MSC/VLR of the target MS to the GMLC according to prior art.

In the second preferred embodiment of the invention, the GMLC is configured to request information on the state of the target MS in both domains in response to receiving message 3-2 comprising the address of the SGSN and the address of the MSC/VLR. Therefore, the GMLC sends to the MSC/VLR message 3-3 requesting information on the state of the target MS in the CS domain. The MSC/VLR indicates the subscriber state to the GMLC in the message 3-4. The GMLC also requests the subscriber state of the target MS in PS domain by sending message 3-5 to the serving SGSN. The SGSN sends the MM state of the target MS to the GMLC in message 3-6. The GMLC decides on the basis of the information received in messages 3-4 and 3-6 via which domain the location information request should be sent. The decision is easy if the target MS is attached only to one of the domains or is active only in one domain, since the domain is then used. If the target MS is active in both domains or not active but attached to both of the domains, the selection may be performed as described for FIG. 2.

In one embodiment of the invention the GMLC is configured first to check the state of the target MS in the CS domain and if the state is active, not to request the state of the target MS in the PS domain, but instead send the location request via the CS domain. Thus, in this embodiment, messages 3-5 and 3-6 are omitted when the target MS is engaged in a circuit switched call.

In one embodiment of the invention the GMLC is configured first to check the state of the target MS in the PS domain and if the state is ready, not to request the state of the target MS in the CS domain, but instead send the location request via the PS domain. Thus, in this embodiment, messages 3-3 and 3-4 are omitted when the target MS is active in the PS domain.

Figure 4:
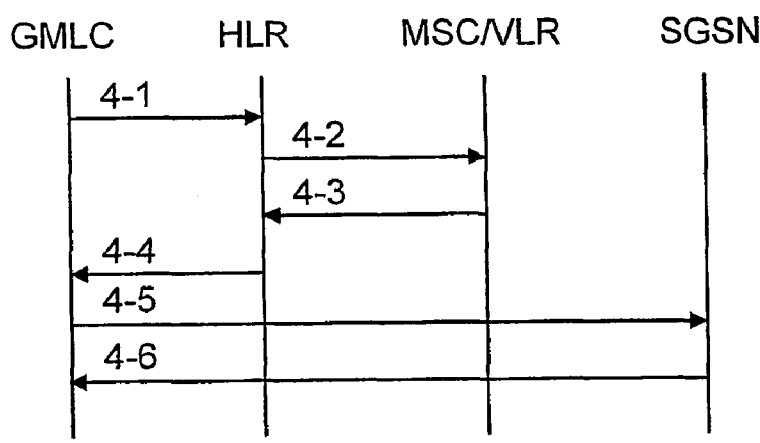

FIG. 4 illustrates signalling according to a third preferred embodiment of the invention. The assumptions made for FIG. 4 are the same as for FIG. 2.

In response to receiving an LCS request from the client, the GMLC acts as described for FIG. 2 and sends message 4-1 requesting routing information for LCS to the HLR. The HLR verifies the GMLC as described earlier. In the third preferred embodiment of the invention the HLR is configured to request the state of the target MS in the CS domain in response to receiving message 4-1 at least when the target MS has both an SGSN address and an MSC/VLR address as a routing address. Therefore, the HLR sends to the MSC/VLR message 4-2 requesting information on the state of the target MS in the CS domain. The MSC/VLR indicates the subscriber state to the HLR in message 4-3.

After receiving message 4-3, the HLR composes message 4-4 to the GMLC. In the third preferred embodiment of the invention, when the address of the SGSN is available the HLR is configured to add to message 4-4 the address of the MSC/VLR only if message 4-3 indicated that the state of the target MS was active. The HLR adds the address of the SGSN to message 4-3 if the address of the SGSN is available. When message 4-3 is ready, the HLR sends message 4-3 to the GMLC.

If the GMLC receives in message 4-3 only either the address of the SGSN or the address of the MSC/VLR, then the GMLC sends the location request to the address in message 4-3. If both addresses, i.e. the address of the SGSN and the address of the MSC/VLR, were received from the HLR in message 4-3, the GMLC is configured to request the subscriber state of the target MS in the PS domain by sending message 44 to the serving SGSN. The SGSN sends the MM state of the target MS to the GMLC in message 4-5. If the MM state is idle, the GMLC sends the location request via the CS domain. If the MM state is ready (i.e. MS is active in both domains), the selection via which domain the location information request should be sent may be performed as described for FIG. 2.

In some other embodiment of the invention the GMLC may add to message 4-1 a parameter, the value of which indicates whether the GMLC requires information on the state of the target MS in the CS domain. In the embodiment the HLR is configured to act according to the parameter value.

In some other embodiment of the invention the HLR is configured to add the address of the MSC/VLR to message 44 if the message 4-3 indicated that the state of the target MS was not detached.

Figure 5:
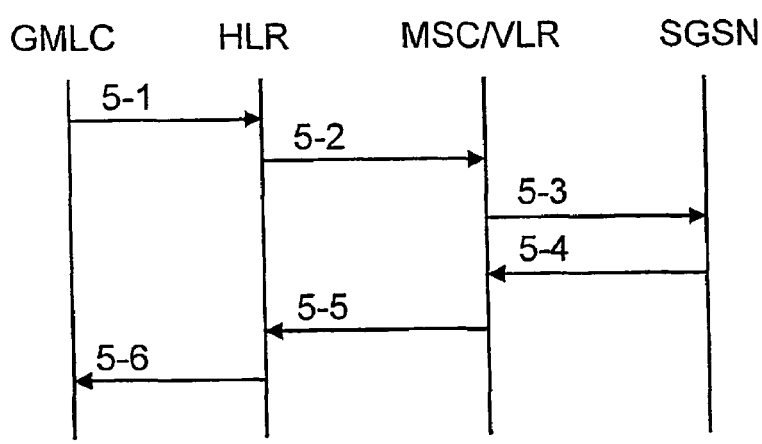

FIG. 5 illustrates signalling according to a fourth preferred embodiment of the invention. The assumptions made for FIG. 5 are the same as for FIG. 2.

In response to receiving an LCS request from the client, the GMLC acts as described for FIG. 2 and sends message 5-1 requesting routing information for LCS to the HLR. The HLR verifies the GMLC as described earlier. In the fourth preferred embodiment of the invention the HLR is configured to request the state of the target MS in both domains via the CS domain at least for subscribers having routing address to both domains, in response to receiving message 5-1. Thus, the HLR requests the state of the target MS in the CS domain and in the PS domain by sending message 5-2 to the MSC/VLR serving the target MS. Message 5-2 includes also the address of the serving SGSN.

In response of receiving message 5-2, the MSC/VLR is configured to send message 5-3 to the SGSN to request the MM state of the target MS. The SGSN is configured to send message 5-4 indicating the MM state of the target MS to the MSC/VLR in response to receiving message 5-3.

After receiving message 5-4 the MSC/VLR composes message 54 including information on the state of the target MS in the CS domain and in the PS domain. When message 5-5 is ready, the MSC/VLR sends message 5-5 to the HLR as a response message to request message 5-2. The HLR forwards in message 5-6 the state information of message 5-5 to the GMLC.

The GMLC decides on the basis of the information in message 5-5 via which domain the location information request should be sent. The decision is easy if the target MS is attached only to one of the domains or is active only in one domain, since the domain is then used. If the target MS is active in both domains or not active but attached to both of the domains, the selection may be performed as described for FIG. 2.

In one embodiment of the invention the MSC/VLR is configured to send message 5-3 only if the MSC/VLR has no information on the MM state.

In one embodiment of the invention the MSC/VLR is configured to add to message 5-5 the address of the MSC/VLR only if the subscriber state is active in the CS domain and the address of the SGSN only if message 5-4 indicated that the MM state was either standby or ready.

In one embodiment of the invention the MSC/VLR is configured first to check if the state of the target MS in the CS domain is active, and if the target MS is active not to request the state of the target MS in the PS domain, but instead send message 5-5 comprising the state of the target MS in the CS domain. Thus, in this embodiment, messages 5-3 and 5-4 are omitted when the target MS is engaged in a circuit switched call.

In one embodiment of the invention the HLR is configured to send in message 5-6 the address of the MSC/VLR only if message 5-5 indicated that the subscriber state was active and the address of the SGSN only if message 5-5 indicated that the MM state was either standby or ready.

In some other embodiments of the invention the GMLC may add to message requesting routing information, i.e. message 5-1, a parameter or parameters, the value(s) of which indicate(s) whether the GMLC requires state information on both domains or only one of the domains or none of the domains. In the embodiments the HLR is configured to send message 5-2 including the parameter value(s) of message 5-1 and the MSC/VLR is configured to act according to the parameter value(s) when the GMLC requires state information on at least one of the domains.

The signalling messages shown in FIGS. 2 to 5 are not in absolute chronological order and some of the signalling may be performed simultaneously or differing from the given order. Other functions can also be executed between the described signalling. For example, the MSC and/or the SGSN may accomplish some radio access network procedures in response to receiving the message requesting the state of the target MS. Some of the signalling can also be left out. For example, If the GMLC already knows the address of the SGSN and/or MCS/VLR (e.g. the GMLC has stored the results from a previous location request in a cache-type memory), messages requesting the state of the target MS in corresponding domain(s) may be skipped. However, even if the addresses of the SGSN and MSC/VLR are present at the GMLC for a particular user, the GMLC may perform the above described functionality in order to make sure that it has the most recent information. (In other words, if the GMLC stores the information in a cache, the information preferably has a maximum lifetime.)

The signalling messages are only exemplary and may even comprise several separate messages for transmitting the same information. In addition, the messages can also contain other information. The messages can also be freely combined or divided into several parts. Furthermore, the names of the messages may differ from the above-mentioned ones. Depending on the network structure, other network nodes between which different functions have been divided may participate in the signalling.

Although the invention has been described above with embodiments having two domains, it is obvious to one skilled in the art that the invention can be applied to select a preferred network node to which the GMLC first relays the location request when there are more than two domains and/or networks the target MS can be attached to. For example, the invention can be applied to select whether to send the location request to a network node in a GSM domain (i.e. the GSM network) or to a network node in an UMTS domain (i.e. the UMTS network).

The features of the above embodiments may be combined differently than disclosed above to obtain other embodiments of the invention.

Each of the parameter insertions described in connection with the figures above can be carried out independently of other parameter insertions, and insertions may be freely combined. The names of the signalling messages may differ from those set out above, but the information transmitted in the messages is the same. The messages may also include more information than what is stated above it will be obvious to a person skilled in the art that, as the technology advances, the inventive concept can be implemented in various ways. The invention and its embodiments are not limited to the examples described above but may vary within the scope of the claims.

The invention claimed is:

1. A method of selecting a domain via which a location request is transmitted in a mobile communications system comprising at least a first domain and a second domain both supporting location services, the method comprising:
    receiving a location request relating to a target mobile station from a requesting entity;
    requesting, in response to said target mobile having a first routing address in the first domain and a second routing address in the second domain, the state of the target mobile station at least in the first domain, the state of a target mobile station in a domain indicating at least whether or not the target mobile station is attached and active in the domain; and
    transmitting the location request to the target mobile station via the first domain if the state of the target mobile station in the first domain indicates that the mobile station is active in the first domain.

2. A method according to claim 1, wherein the first domain is a circuit switched domain and the second domain is a packet switched domain.

3. A method according to claim 1, wherein the first domain is a packet switched domain and the second domain is a circuit switched domain.

4. A method of selecting a domain via which a location request is transmitted in a mobile communications system comprising at least a first domain and a second domain both supporting location services, the method comprising:
    receiving a location request relating to a target mobile station from a requesting entity;
    requesting the state of the target mobile station in the first domain and in the second domain, wherein the state of a target mobile station in a domain indicates at least whether or not the target mobile station is attached to the domain;
    if the state of the target mobile station in the first domain indicates that the target mobile station is detached from the first domain and the state of the target mobile station in the second domain indicates that the target mobile station is attached to the second domain, transmitting the location request to the target mobile station via the second domain; and
    if the state of the target mobile indicates in the first domain that the target mobile station is attached to the first domain and the state of the target mobile station in the second domain indicates that the target mobile station is attached to the second domain, selecting, on the basis of a predetermined set of rules comprising at least one rule, the domain to be used and transmitting the location request via the selected domain.

5. A method according to claim 4 wherein the first domain is a circuit switched domain and the second domain is a packet switched domain.

6. A method according to claim 4 wherein the first domain is a packet switched domain and the second domain is a circuit switched domain.

7. A system comprising:
    a first domain supporting a location service; and
    a second domain supporting the location service,
    a first network node for routing via either the first domain or the second domain a location service request relating to a target mobile station;
    wherein the system is arranged to request, in response to said target mobile having a first routing address in the first domain and a second routing address in the second domain, the state of the target mobile station at least in the first domain and to use the information on the state of the target mobile station in the first domain when selecting the domain via which the location request is routed, the state of the target mobile station in a domain indicating at least whether or not the target mobile station is attached to the domain.

8. A system according to claim 7, wherein
    the system is arranged to request the state of the target mobile station also in the second domain and to use also the information on the state of the target mobile station in the second domain when selecting the domain via which the location request is routed.

9. A system according to claim 7, wherein
    the first network node is arranged to store the result of the location request in a memory and in response to a next location request relating to the same target mobile station (MS) to decide according to predetermined conditions whether the stored result can be used to select the domain.

10. A system according to claim 9 wherein
    the first network node is arranged to indicate in a routing address request whether the state of the target mobile is to be requested; and
    the system further comprises a second network node having routing addresses for the target MS, the second network node being arranged to request the state of the target MS in response to receiving a routing address request indicating that the state of the target MS is to be requested.

11. A system according to claim 10, wherein
the second network node is arranged to request the state of the target MS in the second domain via the first domain.

12. A system according to claim 7, wherein the first domain is a GSM network and the second domain is an UMTS network.

13. A network node in a communications system comprising at least a first and a second domain both supporting location services, the network node comprising for a mobile station a first routing address to the first domain and a second routing address to the second domain, said mobile station being capable to operate in the first domain and the second domain,
the network node being configured, in response to receiving a routing information request for a location service targeted to the mobile station having the first routing address and the second routing address, to request the state of the mobile station at least in the first domain, the state of the mobile station in a domain indicating at least whether or not the mobile station is attached to the domain.

14. A network node according to claim 13, further configured to respond to the routing address request by giving only the first routing address in the first domain if the mobile station is active in the first domain.

15. A network node according to claim 13, further configured to request the state of the mobile station also in the second domain, and to respond to the routing address request by giving the first routing address in the first domain if the target mobile station is attached to the first domain and the second routing address in the second domain if the target mobile station is attached to the second domain.

16. A network node in a communications system comprising at least a first and a second domain both supporting location services, the network node being arranged to comprise information on the state of a mobile station in the first domain when the mobile station is in the service area of the network node, said information on the state of the mobile station in the first domain indicating at least whether or not the mobile station is attached to the first domain,
the network node being configured, in response to receiving a request of the state of the mobile station, to request the state of the mobile station in the second domain and, if the mobile station is attached to at least one of the domains, to send a response to the request, the response indicating at least the first domain, if the mobile station is attached to the first domain and the state of the target mobile in the second domain indicates that the target mobile is detached from the second domain, the response indicating at least the second domain, if the mobile station is detached from the first domain and the state of the target mobile in the second domain indicates that the target mobile is attached to the second domain, and the response indicating the first domain and the second domain, if the mobile station is attached to the first domain and the state of the target mobile in the second domain indicates that the target mobile is attached to the second domain.

17. A network node according to claim 16, further configured to request the state of the mobile station in the second domain only if the request indicates that the state in the second domain is needed.

18. A network node in a communications system comprising at least a first domain and a second domain both supporting location services, the network node being arranged to perform location services,
and configured, in response to receiving a location request relating to a target mobile station from a requesting entity, said target mobile having a first routing address in the first domain and a second routing address in the second domain, to request at least the state of the target mobile station in the first domain, the state of the mobile station in a domain indicating at least whether or not the mobile station is attached to the domain, and to use the state information when deciding via which domain to route the location request.

19. A network node according to claim 18, further configured to request the state of the target mobile station in a domain by sending a routing address request indicating that the state of the target mobile is required in the domain.

20. A network node according to claim 18 further configured to store the result of the location request in a memory and in response to a next location request relating to the same target mobile station to decide according to predetermined conditions whether the stored result can be used to select the domain and if the stored result can be used not to request the state of the target mobile station.

21. A method of selecting a domain via which a location request is transmitted in a mobile communications system comprising at lest a first domain and a second domain both supporting location services, the method comprising:
receiving a location request relating to a target mobile station from a requesting entity;
requesting, in response to said target mobile having a first routing address in the first domain and a second routing address in the second domain, the state of the target mobile station at least in the first domain, the state of a target mobile in a domain indicating at least whether or not the target mobile station is attached to the first domain;
selecting the first domain to be a domain via which the location request is transmitted to the target mobile station if the state of the target mobile station in the first domain indicates that the mobile station is attached to the first domain; and
transmitting, in response to the first domain being selected, the location request to the target mobile station via the first domain.

* * * * *